DATA ACQUISITION AND RECORDING SYSTEM

Filed May 5, 1964 Sheet 1 of 4

INVENTOR:
Jacob Chapsky
By Keith D. Beecher
Attorney

INVENTOR
Jacob Chapsky
By Keith D. Beecher
Attorney

INVENTOR:
Jacob Chapsky
By Keith D. Beecher
Attorney

INVENTOR:
Jacob Chapsky
By Keith D. Beecher
Attorney

United States Patent Office 3,419,883
Patented Dec. 31, 1968

3,419,883

DATA ACQUISITION AND RECORDING SYSTEM

Jacob Chapsky, Los Angeles, Calif., assignor, by mesne assignments, to Lockheed Aircraft Corporation, Plainfield, N.J., a corporation of California Filed May 5, 1964, Ser. No. 365,019
4 Claims. (Cl. 346—74)

ABSTRACT OF THE DISCLOSURE

Tape recording meter reading unit featuring a timing switch driven by the tape drive and having a position corresponding to the advancement of the tape by a length just sufficient to receive a cycle of data from one meter, and a control switch wired to the drive so that the drive can be activated by turning on the control switch and the drive will automatically be turned off by the timing switch at the end of the cycle and disabled from subsequent activation for a new cycle until the control switch is returned to its off position.

The present invention relates to an improved recording system and apparatus for storing digital data for subsequent electronic data processing. The invention is particularly concerned with an improved magnetic tape recording system and apparatus for use in conjunction with utility meters and the like.

The improved recording system and apparatus of the present invention is of the same general type as described in copending application Ser. No. 252,726 filed Jan. 21, 1963, and now abandoned; and in copending application Ser. No. 253,955 filed Jan. 25, 1963, now Patent No. 3,195,139.

The particular recording system and apparatus of the invention has particular utility in recording data corresponding to the readings of domestic watt-hour meters, and the like. When so used, the recorded information may be fed directly to electronic data processing equipment at the central station, and the system and apparatus of the invention replaces the laborious and time consuming manual operations of reading the utility meters at the various locations, manually entering the meter readings in a record book, and subsequently transcribing the readings into a form suitable for electronic data processing and billing.

It will become evident as the description proceeds, however, that the recording system and apparatus of the present invention has generally utility. It may be used, for example, not only by utility companies for acquiring data from the domestic utility meters; but also by rental agencies, time keeping organizations, statistical survey organizations, and the like.

The recording system and apparatus to be described herein is capable of semi-automatic and fully automatic operation. For semi-automatic operation, a series of manually-operable switches are provided on the recorder unit, and these switches are operated by the utility company's meterman as he reads each meter and in correspondence with the particular meter readings.

For fully automatic operation, suitable digital encoders, such as described and claimed in copending application Ser. No. 317,548 filed Oct. 21, 1963, and now abandoned, are installed in the meters. These encoders serve to convert the meter readings into appropriate binary-coded digital data. Then, the meterman merely plugs his recorder into a receptacle at the particular meter, and digital data corresponding to the current meter reading is recorded in the recorder.

A source of binary-coded data representing the selected serial number of the meter may be provided adjacent each meter; and this source may also provide data representing the area code and the rate code, if such data is required in the particular utility system. The binary-coded data from the source may also be recorded in the recording system of the invention in conjunction with the other binary-coded data described above.

The above-mentioned recordings are made at each meter and they appear recorded on a magnetic tape in the recording apparatus of the invention, as a succession of frames. The frames are grouped into blocks of data respectively corresponding to the particular meter readings. Each block is identified by recorded digital data representing the serial number, the area code and the rate code, this latter data being derived from the aforesaid source.

An object of the present invention, therefore, is to provide an improved, reliable recording system and apparatus, which is particularly suited for recording digital data in a form suitable for use in present-day electronic data processing and billing equipment.

Another object of the invention is to provide such an improved recording system and apparatus which is relatively simple and inexpensive to construct, and yet which operates reliably and accurately at high speed in the acquisition and recording of such digital data.

A feature of the invention is the provision in the recording apparatus of a simplified electronic system for framing the digital inputs automatically into parallel/serial recordings along a plurality of recording channels on the magnetic tape.

A further feature of the invention is the provision of such a framing system which permits the serial/parallel recordings to proceed along the tape from block to block and without the need for spaces between successive blocks on the tape, so as to provide for the most efficient use of the available surface area of the tape.

Another feature of the invention is the provision of an improved electronic timing system in the recording apparatus of the invention, which system permits the operator to press a button and thereby activate the recording mechanism for a particular interval which is selected to enable a series of frames to be recorded on the tape corresponding to one block of data.

Other objects and advantages of the invention will become apparent from a consideration of the following specification, when the specification is considered in conjunction with the accompanying drawings, in which.

As mentioned above, the recorder system and apparatus of the present invention is particularly adapted for deriving digital data from utility meters, such as the usual watt-hour meter. For that purpose, it is necessary that the meter be first converted so that digital signals may be developed corresponding to the meter reading. Suitable encoder means for this purpose is described, for example, in copending application Ser. No. 254,126 which was filed Jan. 28, 1963, and now abandoned.

Figures 1, 4:
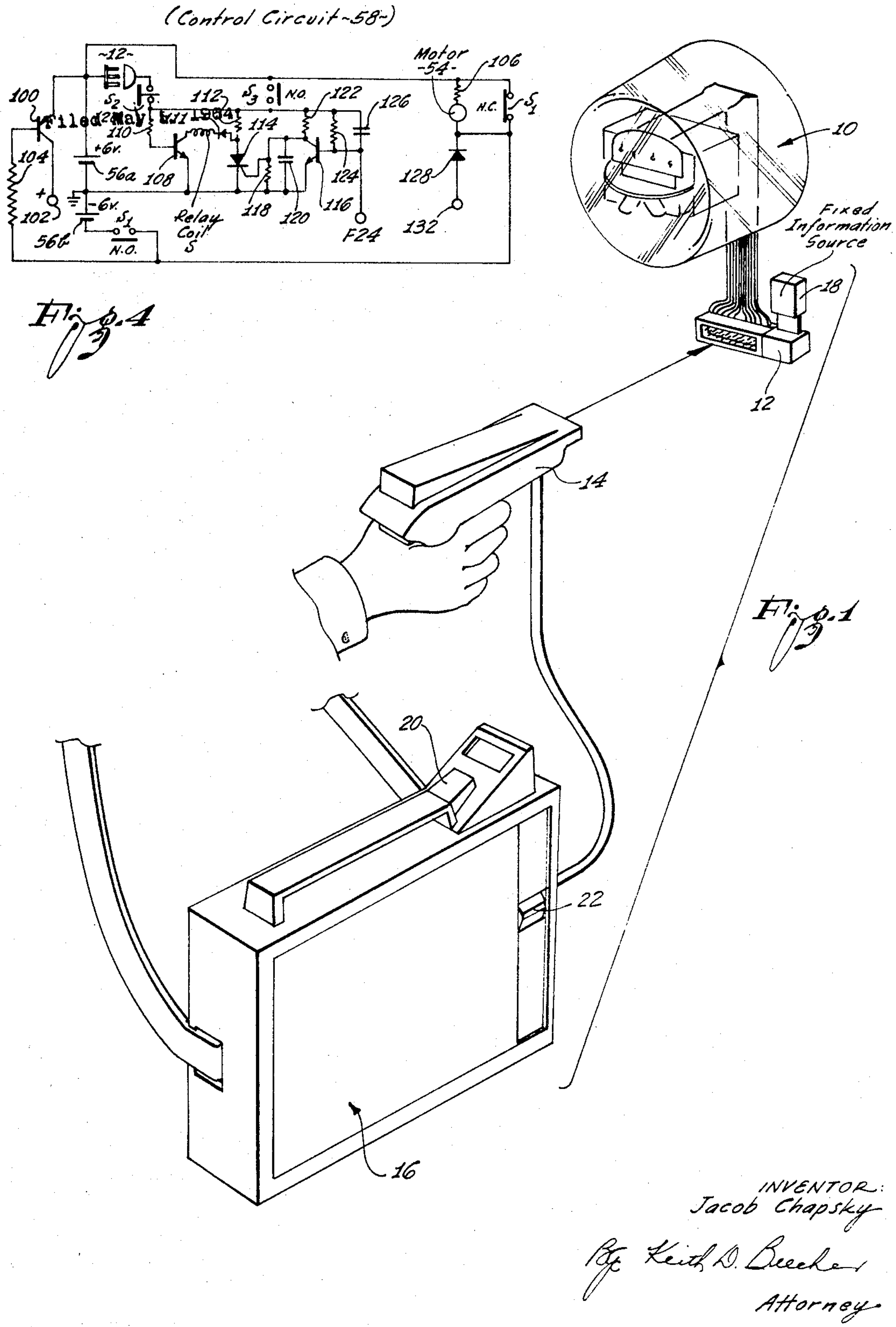
FIGURES 1 and 1A are schematic diagrams illustrating the recording system and apparatus of the invention, and the manner in which it may be used to obtain the readings of a domestic utility watt-hour meter.
FIGURE 4 is a circuit diagram of a control circuit utilized in the control system of FIGURE 3.
Figure 1A:
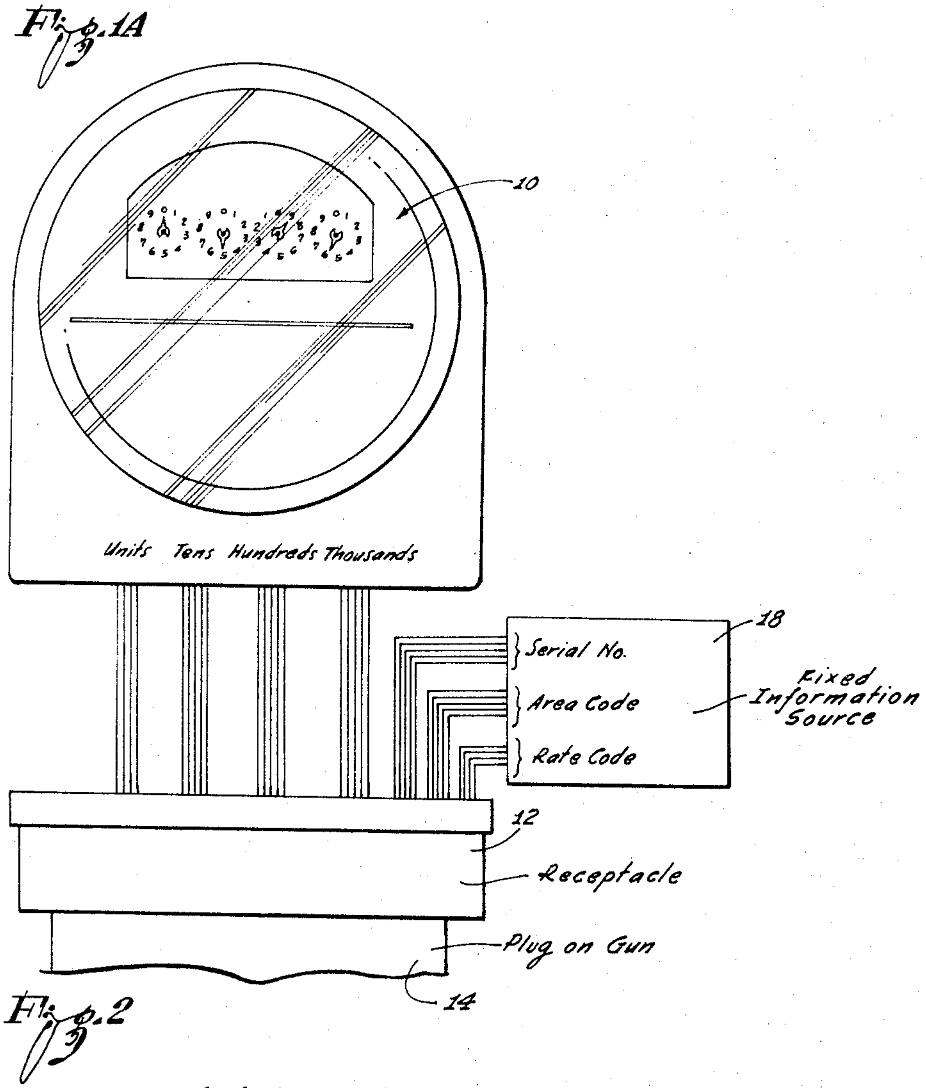

The encoder described in the copending application is mounted, for example, in a usual watt-hour meter, such as the meter 10 of FIGURES 1 and 1A. This meter includes a decade register, and the decade register drives a plurality of shafts which, in turn, drive the indicators of the meter. These indicators show the power consumption in decimal integers at the units, tens, hundreds, and thousands level.

The watt-hour meter 10 shown in FIGURES 1 and 1A has leads extending from it to a receptacle 12. These leads are connected from the digital encoder in the meter to the receptacle, so that binary coded signals corresponding to the meter readings are produced at terminals in the receptacle 12.

A recorder 16 is illustrated in FIGURE 1, and the recorder may be constructed in accordance with the concepts of the present invention. The recorder is equipped with a plug 14, and the plug 14 may be plugged into the receptacle 12.

When the plug 14 is plugged into the receptacle 12, the operator merely depresses a push-button switch 20 on the recorder. (The switch 20 may, if so desired, be located on the plug 14.) The actuation of the switch 20 causes the recorder 16 to be activated for a predetermined interval, so as to enable the digital information derived at the receptacle 12 to be recorded on a magnetic tape in the recorder.

Also included adjacent the meter 10 is a source 18 of binary coded data. This source 18 provides binary coded data representing the serial number of the particular station. The serial number may, for example, be a five digit decimal quantity. Also, if required, the source 18 provides binary coded data corresponding to the area code, and further binary coded data corresponding to the rate code. The area code may, for example, be a two digit decimal quantity, and the rate code may be a single digit decimal quantity.

The output terminals of the source 18 are also connected to the receptacle 12. When the operator plugs the plug 14 of the recorder 16 into the receptacle 12, and pushes the push-button control 20 associated with the recorder, the binary coded data from the watt-hour meter 10 and from the source 18 is recorded on the magnetic tape in the recorder 16, as will be explained in detail. The binary coded data from the source 18 may be coded directly in the receptacle 12, as explained in copending application Ser. No. 254,620, filed Jan. 29, 1963, now Patent No. 3,193,635.

The binary coded data recorded on the tape in the recorder represents the readings of the meter 10 at the particular time that the plug 14 is plugged into the receptacle 12. The binary data representing the serial number of the particular meter is also recorded on the tape. In addition, and if required, further information, in binary coded form, may be recorded on the tape, so as to indicate the area code and the rate code. This latter information is not required if a single area or zone is used to include all the meters in a particular locality, and/or if the rate for the electrical service is the same through the area.

As will be described, whenever the push-button 20 is depressed, the information from the meter 10 and from the source 18 is recorded twice on the magnetic tape. The two recordings are subsequently compared by the automatic processing system at the central station so that a redundancy check may be made. If there is any discrepancy between the two recordings, they are automatically discarded by the processing system.

The recorder 16 also includes a push-button switch 22 which may be actuated whenever an error occurs, and which permits the proper information to be recorded in a subsequent block on the magnetic tape in the recorder.

As mentioned above, the schematic representation of FIGURE 2 shows a portion of the magnetic tape 24 which is drawn through the recording apparatus and system 16.

The digital information from the meter 10 and from the source 18 is recorded along adjacent channels on the tape in a series of frames. In the illustrated example, for example, one of the channels receives sync pulses, and these are recorded at each successive frame time (F1–F12). The twelve frames in the illustrated embodiment constitute a block of data, and as mentioned above, each block is recorded twice for redundancy check purposes.

The channels 1–4 on the tape serve as the number channels, and the binary bits representing the various decimal integers of the information derived from the meter and from the source 18 are recorded in parallel in each frame on the tape. As described in the aforementioned copending application Ser. No. 252,726, the encoder included in the meter 10 also provides interpolative information, and this information is recorded on channel 5 on the tape. Channel 6 on the tape constitutes the error channel, and a recording is made on that channel only when the particular pair of blocks are to be disregarded. The synchronizing pulses are recorded in channel 7 on the tape.

Therefore, for each frame time, a synchronizing pulse is recorded in channel 7; binary digital information is recorded in each of the channels 1, 2, 3 and 4, and interpolative information is recorded in the channel 5. The bits for each channel are recorded in parallel during each frame time. In a constructed embodiment of the invention, the magnetic tape has a particular polarity, and that polarity is reversed at a particular position to represent 1 bit binary bit, whereas the polarity is left unchanged to represent a 0 binary bit.

Figure 2:
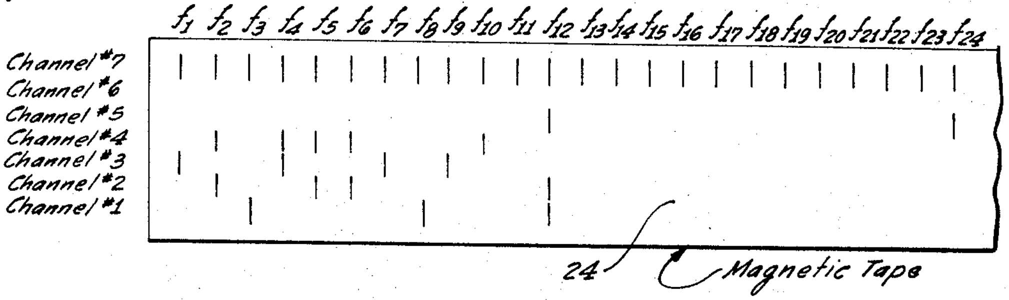
FIGURE 2 is a diagram illustrating a portion of a magnetic tape and showing the manner in which the data is recorded on the tape in the apparatus and system of the invention.
Figure 3:
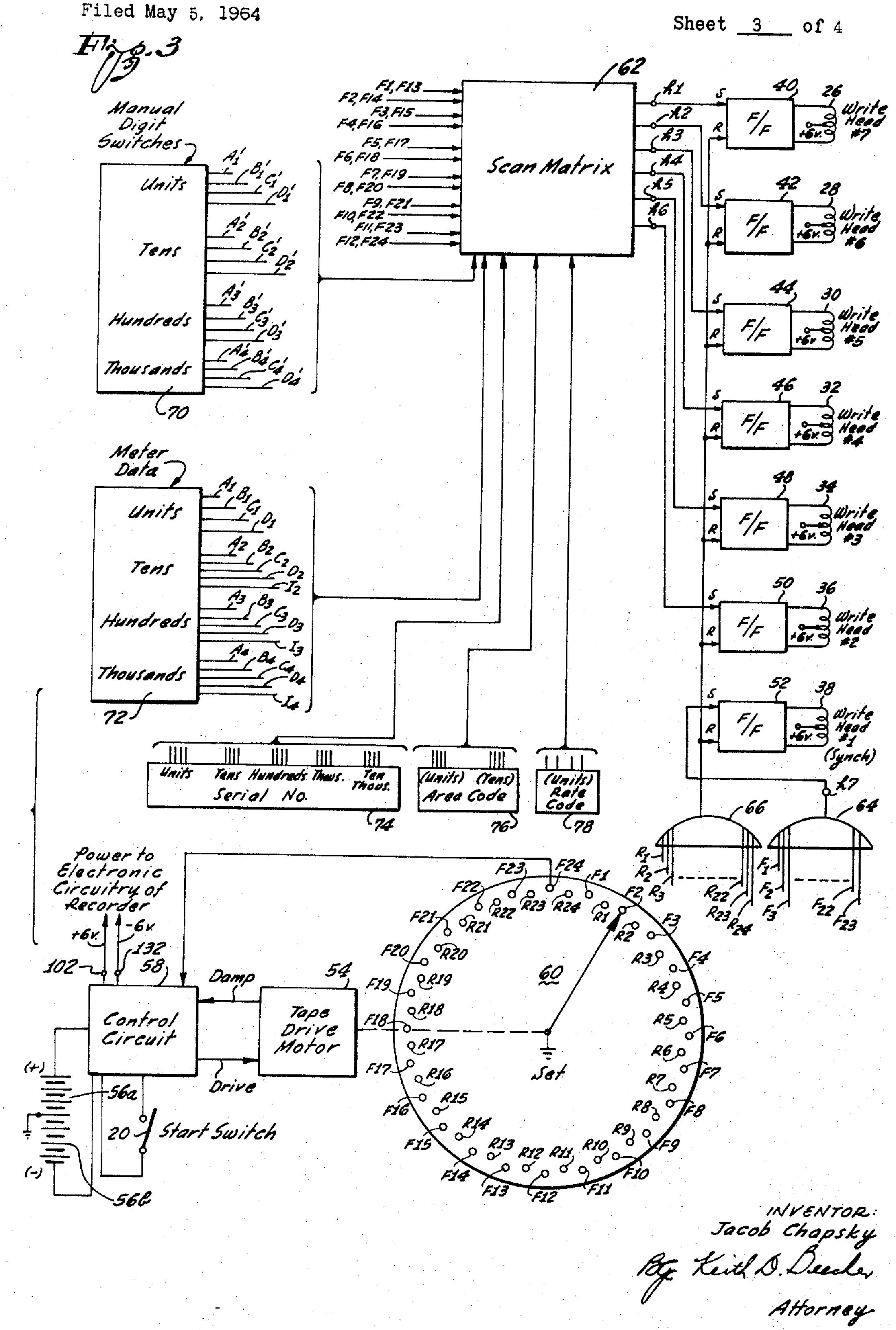
FIGURE 3 is a logic diagram of the framing and timing control system which is constructed in accordance with the concepts of the invention and which is incorporated in the recorder system.

The recording along the channels of the tape of FIGURE 2 is carried out by a group of electro-magnetic write heads 26, 28, 30, 32, 34, 36 and 38 shown diagrammatically in FIGURE 3. These write heads are coupled to the magnetic tape 24 adjacent the aforesaid respective channels on the tape.

A corresponding plurality of flip-flops 40, 42, 44, 46, 48, 50 and 52 are coupled to respective ones of the write heads 26, 28, 30, 32, 34, 36 and 38. When only of the aforesaid flip-flops are triggered to a "set" condition, the resulting current flow in its associated write head causes a binary 1 to be recorded on the magnetic tape 24. Conversely, when any one of the flip-flops is in its "reset" condition, the current through the associated write head is such that the magnetic tape 24 is returned to its initial magnetic state, so as to represent a binary 0.

The tape 24 is drawn past the heads 26, 28, 30, 32, 34, 36 and 38 by a tape drive motor represented by the block 54. The drive motor 54 is energized by a battery source **56*a*, 56*b*, and the application of the energizing power from the battery to the drive motor is controlled by a control circuit 58. The push-button start switch 20 is connected to the control circuit 58, and when that switch is actuated, the control circuit causes the motor 54 to be energized by the battery 56** until a predetermined number of frames have been recorded on the tape.

In the illustrated example, for example, the aforesaid interval is such that a first group, or block, of frames F1–F12 is recorded on the tape 24; and then a redundant group, or block, F13–F24 is subsequently recorded. The control of the system is such that there is no spacing between the two redundant blocks of frames, or between each pair of blocks and the next succeeding pair of blocks, so that maximum usage of available tape is realized.

The tape drive motor 54 also drives a rotary multi-position switch 60. The switch 60 includes a first set of contacts designated F1–F24, and it includes a second interposed set of contacts designated R1–R24. The contacts R1–R24 are designated the "reset" contacts. The contacts F1–F24 are designated the "set" contacts, and these are connected to a scan matrix 62, which will be described in more detail in conjunction with FIGURE 5. The "set" contacts F1–F23 are also connected through an "or" gate 64 to the set input terminal of the flip-flop 52. The "reset" contacts R1–R24 are all connected through an "or" gate 66 to the reset input terminal of each of the flip-flops.

When the drive motor 54 is energized, the movable arm of the switch 60, which is grounded, moves from contact to contact, starting, for example, with the F1 set contact. Each time the grounded arm engages any one of the reset contacts, all the flip-flops are reset. The set contacts F1–F24 of the switch 60 establish the frames on the tape 24 of FIGURE 2.

The flip-flop 52 is the synchronizing flip-flop, and each time the movable arm of the switch 60 engages one of the set contacts, this flip-flop is set. This causes a corresponding synchronizing pulse to be recorded in channel 7 on the tape 24 for each frame, as shown in FIGURE 2.

Figure 5:
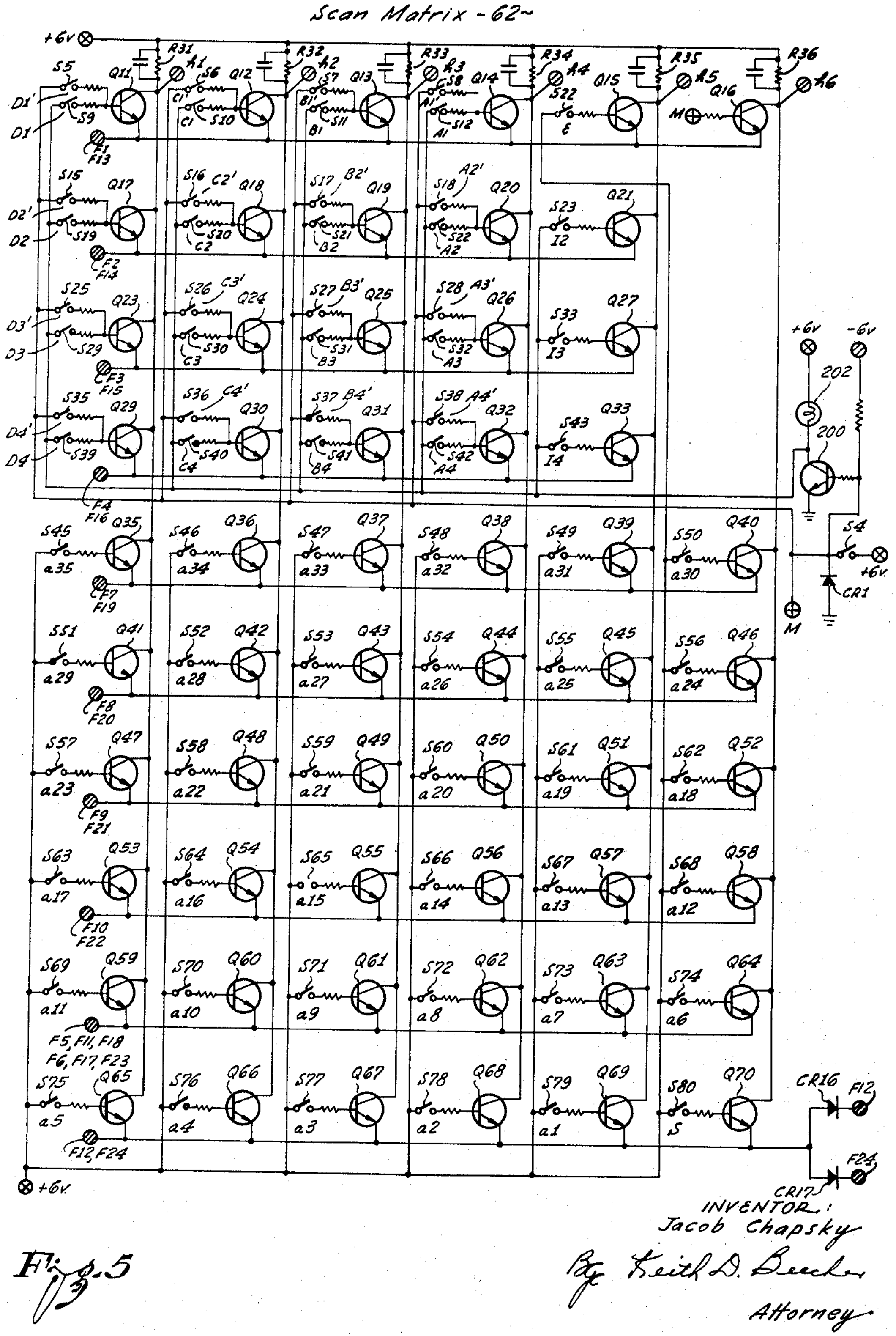
FIGURE 5 is a circuit diagram of a matrix which is also used in the control system of FIGURE 3.

It will be appreciated that the successive engagement of the first twelve set contacts F1–F12 of the switch 60 cause twelve synchronizing pulses to be recorded, these corresponding to the twelve frames of a block of data. Then the following eleven positions of the switch, corresponding to the engagement of the second twelve set contacts F13–F23 cause the synchronizing pulses for the twelve redundant frames of that block to be recorded in the #7 channel of FIGURE 2. Between each engagement of the arm of the switch 60 with a set contact, the arm engages a reset contact (R1–R24) so as to reset all the flip-flops. For the F24 position, the switch S80 of FIGURE 5 is closed. This causes the synchronizing pulse for the F24 position to be recorded in the #6 channel rather than the #7 channel. In this manner, the end of each block can be identified by the automatic processing equipment at the central station.

The recorder unit also includes a set of manual digit switches, represented by the block 70. These switches are located directly on the recorder 16, and they may be set by the operator when, for any reason, the automatic portion of the meter 10 is not operating, or when the meter 10 is not equipped with an automatic portion.

The operator sets the digit switches at the units, tens, hundreds, and thousands level to correspond with the corresponding meter readings. These switches cause various leads at the different levels to represent in binary coded form the corresponding reading. For example, a set of leads $A'_1$, $B'_1$, $C'_1$, $D'_1$ represents the units level; a set of leads $A'_2$, $B'_2$, $C'_2$, $D'_2$ represents the tens level; a set of leads $A'_3$, $B'_3$, $C'_3$, $D'_3$ represents the hundreds level; and a set of leads $A'_4$, $B'_4$, $C'_4$ $D'_4$ represents the thousands level.

These leads are all connected to the scan matrix 62. Then, as the multi-position switch 60 sweeps from one set contact to another, different groups of the leads are connected through the scan matrix 60 to the flip-flops 40, 42, 44 and 46. For example, in the first block, as the arm of the switch 60 engages the F1 contact, the "units" $A'_1$, $B'_1$, $C'_1$, $D'_1$ leads are connected to the flip-flops 40, 42, 44 and 46; when the F2 contact is engaged, the "tens" leads $A'_2$, $B'_2$, $C'_2$, $D'_2$ are connected to the respective flip-flops; when the F3 contact is engaged, the "hundreds" leads $A'_3$, $B'_3$, $C'_3$, $D'_3$ are connected to the flip-flops; and when the F4 contact is engaged, the "thousands" leads $A'_4$, $B'_4$, $C'_4$, $D'_4$ are connected to the flip-flops.

The aforementioned leads from the meter 10 are designated by the block 72, and these leads have the same designation as the leads from the manual digit switches of the block 70, without the prime designation. It will be understood that when the manual digit switches are all set to 0, the outputs from the block 72 are effective. On the other hand, when there are no outputs from the block 72, the outputs created by the settings of the manual digit switches in the block 70 become effective.

In like manner, the leads designating the serial number of the meter originating, for example, in a block 74 (FIGURE 3), are connected to the scan matrix 62, and these leads are selected and applied to the flip-flops by other positions of the switch 60. Likewise, the area code leads are derived from a block 76 and the rate code leads are derived from a block 78. These latter leads are also connected to the scan matrix. As the multi-position switch 60 scans through one complete revolution, each group of leads from the block 70, 72, 74, 76 and 78 is selected at the proper time, and the corresponding flip-flops are set accordingly. In this manner, the information is recorded in a serial/parallel form from frame to frame along the tape, as shown in FIGURE 2. As mentioned above, the first twelve frames contain all the information, and the process is repeated for redundancy check purposes during the next twelve frames.

At the end of the second, or redundant block, the switch arm of the switch 60 engages the F24 contact. This engagement causes the control circuit immediately to deactivate the tape drive motor and simultaneously to connect a damping circuit across the motor. This causes the motor to stop abruptly, and the cycle is completed. It is to be pointed out that the tape drive motor 54 is stopped and started at the beginning and end of each recording cycle in sufficient time, so that successive blocks along the tape 24 may be recorded without the need for waste spacing between each succeeding block or pair of blocks.

The control circuit 58 of FIGURE 3 is shown in circuit detail in FIGURE 4. The circuit of FIGURE 4 includes PNP transistor 100. This transistor may be of the type presently designated 2N1305. The emitter of the transistor 100 is connected to the positive terminal of the six-volt source **56*a*, and the collector is connected to an output terminal 102. The negative terminal of the source 56*a* is grounded. The base of the transistor 100 is connected to a resistor 104 which, in turn, is connected to the movable arm of a normally-open contact S1 and to a normally closed contact S1 of a relay which is energized by a coil S. The resistor 104** may have a resistance, for example, of the order of 2.2 kilo-ohms.

The normally-open contact S1 is connected to the negative terminal of the six-volt source **56*b*. The positive terminal of the source 56*b* is grounded. The movable arm of a normally-closed contact S1, on the other hand, is connected to the emitter of the transistor 100. The motor 54 and a series resistor 106 are connected across the normally-closed contact S1. The resistor 106** may have a resistance, for example, of 27 ohms.

The circuit of FIGURE 4 also includes an NPN transistor 108. This transistor may be of the type presently designated 2N2923. The emitter of the transistor 108 is grounded, and its collector is connected to the relay coil S. A resistor 110 is connected to the base of the transistor 108 and to the aforementioned push-button start switch 20. The resistor 110 may have a resistance of 10 kilo-ohms. The start switch 20 is connected through a portion of the receptacle 12 to the positive terminal of the source **56*a***.

The portion of the receptacle 12 included in the control circuit 58 is arranged to assure that the control circuit will not be activated unless the plug 14 of FIGURES 1 and 1A is properly inserted in the receptacle 12. Only when the plug is fully and properly inserted in the receptacle, will the appropriate contact be made between the positive terminal of the source **56*a* and the start switch 20**.

The relay coil S is connected through a diode 111 to the junction of a resistor 112 and the anode of a silicon controlled rectifier 114. The silicon controlled rectifier may be of the type designated 2N1595. The resistor 112 may have a resistance, for example, of 110 ohms. The cathode of the silicon controlled rectifier 114 is grounded, and the resistor 112 is connected back to the switch 20. The relay also includes a normally-open latching contact S3, this latter contact being connected between the resistor 112 and the positive terminal of the source **56*a***.

The circuit also includes an NPN transistor 116. This latter transistor may be of the type designated 2N2923. The emitter of the transistor 116 is grounded, and the collector is connected to the gate electrode of the silicon controlled rectifier 114 and to a grounded resistor 118. The resistor 118 may be shunted by a capacitor 120. The resistor 118 may have a resistance, for example, of 1 kilo-ohm, and the capacitor 120 may have a capacity of .05 microfarad.

The collector of the transistor 116 is connected to a resistor 122, and the base is connected to a resistor 124. Both these resistors are connected back to the start switch 20. The resistor 122 may have a resistance of 2.2 kilo-ohms, and the resistor 124 may have a resistance of 22 kilo-ohms. The resistor 124 is shunted by a capacitor 126. This capacitor may have a capacity of 500 micro-micro-farads. The base is also connected to a terminal designated F24, this latter terminal being connected back to the contact F24 of the rotary switch 60.

At this point it might be mentioned that the set contact F1 of the rotary switch 60 (FIGURE 3) is connected to the set contact F13, the set contact F2 is connected to the set contact F14, and so on. This is so that a double, redundant scan may be made for one revolution of the switch 60, so as to provide two blocks of data on the tape 24 (FIGURE 2), for redundancy purposes, as mentioned above. However, the F24 contact alone is used to stop the scanning, so that it cannot be connected to the F12 contact.

The circuit of FIGURE 4 also includes a diode 128. The cathode of the diode 128 is connected to the motor 54. The anode of the diode 128 is connected to an output terminal 132.

When the circuit of FIGURE 4 is in the inactive state, all the transistors are not conductive. The terminal 102 normally supplies the +6 volts to the electronic circuitry, whereas the terminal 132 normally supplies the −6 volts. It will be appreciated, therefore, that so long as the control circuit 58 is inactive, these voltages are zero, so that the electronic circuitry in the system is de-energized.

Now, should the meter man properly plug the plug 14 into the receptacle 12, so as to complete the circuit between the positive terminal of the source 56*a* and the start switch 20, and then, should the start switch 20 be closed, the resulting 6 volts applied to the base of the transistor 108 causes that transistor to become conductive. The resulting current through the relay coil S causes the normally-open contacts S1 and S3 to close, and the normally-closed contact S1 to open. The silicon controlled rectifier 114 is not fired at this time, this being assured by the provision of capacitor 120 which absorbs any voltage surges.

The closure of the normally-open contact S1 applies the −6 volt bias through the resistor 104 to the base of the transistor 100. This causes the transistor 100 to become fully conductive and saturated, so that the positive potential of 6 volts appears at the terminal 102 for energizing the associated electronic circuits.

Likewise, the closure of the normally-open relay contact S1 applies a negative 6 volt potential to the cathode of the diode 128, so that the diode also becomes highly conductive. This causes a negative 6-volt voltage to appear at the terminal 132 so that the associated electronic system may be energized.

Also, the closure of the normally-open latching relay contact S3 permits the operator to remove his finger from the switch 20, and the control circuit 58 of FIGURE 4 will remain latched to its energized condition.

The opening of the normally-closed relay contact S1 permits the motor 54 to become energized, so that the magnetic tape 24 of FIGURE 2 is caused to move, and the movable arm of switch 60 is likewise set in motion. As the movable arm of the switch 60 moves from set contact to reset contact recurrently, the various flip-flops 40, 42, 44, 46, 48, 50 and 52 are selectively set and reset, so that appropriate recordings may be made in the different channels on the magnetic tape 24 of FIGURE 2. This process continues until the movable arm of the switch 60 reaches the set contact 24 so as to ground the contact.

When the arm of the switch 60 engages the set contact 24, a ground is established on the base of the transistor 116. This causes the transistor 116 to become non-conductive. The resulting rise in the collector potential of the transistor 116 fires the silicon controlled rectifier 114. This effectively short-circuits the relay coil S, so that the normally-open latching contact S3 opens. Also, the normally-open contact S1 opens to remove the energizing potential from the terminals 102 and 132. The energizing potential is also removed from the motor 106; and the closure of the normally-closed relay contact S1 places a low impedance across the motor, so that a dynamic brake is effectuated and the motor is stopped almost instantaneously.

It should be pointed out that should the operator maintain S2 depressed throughout the entire cycle, the circuit will not initiate a succeeding cycle until the switch S2 is released and depressed again. This is because once the silicon controlled rectifier 114 has been fired, so as to remove the current from the relay coil S, the relay cannot be re-energized, until the start switch 20 is released and again depressed. This feature of the circuit prevents the erroneous initiation of succeeding cycles.

A typical scan matrix circuit for the matrix 62 is shown in FIGURE 5. The upper portion of the matrix of FIGURE 5 responds to the setting of the switches in the block 70 of FIGURE 3, or to the meter data from the block 72 of FIGURE 3. This upper portion of the matrix includes a group of NPN transistors Q11–Q21, Q23–Q27, Q29–Q33. The first bank of transistors Q11–A16 is activated by the engagement of the set contacts F1–F13 of the switch 60, by the movable contact. The second bank is activated by the engagement of the set contacts F2 or F14, and so on.

When the operator plugs the plug 14 of FIGURE 1 into a receptacle 12 which does not have data terminals corresponding to the reading of the corresponding meter, but which data must be introduced to the recorder 16 by a visual observation of the meter and by a setting of the switches in the unit 70 by the meterman, an appropriate actuator in the receptacle causes the plug 14 to close a switch, designated S4 in FIGURE 5.

The closure of the switch S4 causes the terminal M to assume a positive six volt potential. This in turn causes the transistor Q16 to become conductive, so that a 1 is recorded in track 6 on the tape 24 of FIGURE 2 in the F1 and F13 frame positions, to designate that the data recorded is from the encoded outputs derived from the receptacle 12. Also, the circuit of FIGURE 5 includes a transistor 200 having an indicator lamp 202 in its collector circuit. This indicator lamp glows under the conditions set forth in the preceding paragraph, indicating to the meterman that the data is being recorded from outputs derived from the receptacle 12.

The manual switches of block 70 are designated in FIGURES 3 and 5 by the terms A1′, B1′, C1′, D1′; A2′, B2′, C2′, D2′; A3′, B3′, C3′, D3′; and A4′, B4′, C4′, D4. It will be appreciated that as these switches are actuated in accordance with the meter readings, the transistors Q11–Q14, Q17–Q20, Q23–Q26, Q29–Q32, will have a pattern of conductive and non-conductive states corresponding to the settings of the switches. Then, as the rotatable arm of the switch 60 successively activates the banks of transistors, through the F1–F4 frames, and through the F13–F16 frames, appropriate recordings corresponding to the manually read meter readings, will be recorded on the tape 24 of FIGURE 2. Also, and as mentioned, the conductivity of the transistor Q16 will produce a 1 recording in track 6 at the F1 and F13 frame positions, to designate that a manual reading has been recorded.

The transistor Q15 is controlled by the error switch 22 (FIGURE 1A and FIGURE 5). Whenever an error is encountered, the meterman depresses the switch 22 so as to render the transistor Q15 conductive. This causes a recording to be made at the F1 bit position of the succeeding block of data in the track 5 of the tape 24 of FIGURE 2. Whenever such as recording appears in track 5 at this bit position, an error is indicated, so that the information may be disregarded by the automatic central station data processing equipment.

As mentioned above, since the F12 and F24 contacts of the switch 60 are not interconnected, these contacts are connected to individual terminals, designated F12 and F24 in the matrix of FIGURE 5. These latter terminals are connected through respective diodes CR16 and CR17 to the F12, F24 lead of the matrix.

The remaining information from the units 74, 76 and 78 of FIGURE 3 may be recorded on the tape in any desired configuration. This information is designated by the terms *a*1–*a*35, and these terms are either 1 or 0 in accordance with the coded numbers. The quantities are represented by switches S80–S45 in the matrix of FIGURE 5, in the circuit of the corresponding transistors Q70–Q35.

It will be appreciated that as the movable arm of the switch 60 rotates, different banks of the transistors of the latter group of the matrix are activated, so that information may be recorded in the different frames, and along the six channels of the tape. A certain repetition is shown in the particular matrix illustrated in FIGURE 5, so as to conform with an established 12-frame block. That is, it will be observed that the bank of transistors Q59–Q64 is repetitiously recorded at F5, F6 and F11.

The invention provides, therefore, an improved recording system for acquiring and storing digital data. As described above, the system finds particular utility in conjunction with utility meters, and the like.

The particular embodiment described above is constructed so that for a properly encoded meter, readings may be taken and recorded automatically. However, the apparatus and system is also constructed, so that readings by the meter man may be set up manually on the instrument and recorded therein.

The particular system and apparatus of the invention is particularly advantageous in that it incorporates a simple electronic control system for properly framing the information on the tape, regardless of irregularities in the tape speed, so that relatively inexpensive equipment may be used.

Also, the system and apparatus of the invention is essentially fool-proof in its operation. The system is activated only when the plug 14 is properly inserted in the receptacle 12. It is merely necessary for the meterman to press and release the switch 20. Then, the system of the invention automatically causes two complete blocks to be recorded. At the end of the recording, the system automatically stops itself. The start-stop action is sufficiently rapid, so that succeeding blocks of data may be recorded on the tape, without the need for spaces, so as to conserve storage space on the tape.

The system of the invention also includes an automatic control circuit, which is conceived so that all the electronic systems in the tape recorder are normally de-activated, so as to conserve battery power. Then, when the start switch is actuated, the electronic systems are energized, together with the motor, only so long as the actual recording is being made.

Provision is also made in the system and apparatus of the invention, so that a prolonged actuation of the start switch 20 by the operator will not adversely affect the operation of the system. Also, when an error occurs, provision is made so that the error may be indicated, to enable the automatic data processing system at the central station to disregard the information.

The operation of the system and apparatus of the invention has been found to be extremely reliable, accurate and precise. Yet, the system and apparatus is relatively inexpensive and it operates efficiently in the acquisition of the digital data.

While a particular embodiment of the invention has been shown and described, modifications may be made. The following claims are intended to cover all modifications which fall within the scope of the invention.

What is claimed is:

1. A recording system including: an electric drive motor for moving a recording medium along a given path; recording means disposed adjacent said path for recording binary data on each of a plurality of channels on said recording medium; input memory circuitry for receiving and storing a block of binary coded data; multi-position switch means mechanically coupled to said drive motor to be driven thereby; scanning circuitry coupling said input memory circuitry to said recording means through said multi-position switch means for causing said block of binary coded data to be recorded in said channels in a serial/parallel manner and in a succession of frames along said recording medium; positive and negative sources of direct current electrical potential, relay switch means series coupling said electric drive motor to both said sources in the energized position of said relay switch means to operate the motor and to only one of said sources in the de-energized position of said relay switch means to brake the motor, manually operable switch means coupled to said source of direct current electrical potential and completing a circuit through said relay switch means for energizing the same on closure of said manually operable switch means, a holding circuit activated by closure of said manually operable switch means for holding said relay switch means energized, and circuit means coupled to said holding circuit through said relay switch means and responsive to grounding for de-energizing said relay switch means and de-activating said holding circuit.

2. The recording system defined in claim 1 wherein said circuit means is coupled to a grounding contact on said multi-position switch means.

3. The recording system defined in claim 2 in which said multi-position switch means is constructed to control said scanning circuitry so as to cause the binary signals to be recorded in a first succession of frames along said recording medium and to be redundantly recorded in a second succession of frames along said recording medium before said circuit means de-activates said drive motor.

4. The recording system defined in claim 1 and which includes a further recording means disposed adjacent said path of said recording medium; and circuit means coupled to said multi-position switch means and to said further recording means for causing said further recording means to record a synchronizing pulse on a further channel of said recording medium for selected positions of said multi-position switch.

References Cited

UNITED STATES PATENTS

| | | | |
|---|---|---|---|
| 2,628,346 | 2/1953 | Burkhart | 179—100.2 |
| 3,006,712 | 10/1961 | Eichacker | 346—50 X |
| 3,117,262 | 1/1964 | Mullin | 318—376 X |
| 3,195,139 | 7/1965 | Hood | 346—74 |
| 3,323,132 | 5/1967 | Davis et al. | 346—74 |

BERNARD KONICK, *Primary Examiner.*

J. F. BREIMAYER, *Assistant Examiner.*

U.S. Cl. X.R.

318—375; 346—34